United States Patent
Black et al.

[11] 3,862,716
[45] Jan. 28, 1975

[54] AUTOMATIC CASH DISPENSER AND SYSTEM AND METHOD THEREFOR

[75] Inventors: Robert Black, Kenley; Christopher Hall, Tonbridge, both of England

[73] Assignee: Burroughs Corporation, Detroit, Mich.

[22] Filed: Jan. 14, 1974

[21] Appl. No.: 433,399

Related U.S. Application Data

[63] Continuation of Ser. No. 277,230, Aug. 2, 1972.

[30] Foreign Application Priority Data
Oct. 13, 1971  Great Britain .................... 47615/71

[52] U.S. Cl. ........................ 235/61.7 B, 340/149 A
[51] Int. Cl. ........................... G06k 5/00, G06f 7/00
[58] Field of Search ............. 235/61.7 B, 61.12 N, 235/61.12 M; 340/149 A

[56] References Cited
UNITED STATES PATENTS

| | | | |
|---|---|---|---|
| 3,221,304 | 11/1965 | Enikeieff et al................ | 235/61.7 B |
| 3,662,343 | 5/1972 | Goldstein et al............... | 235/61.7 B |
| 3,665,162 | 5/1972 | Yamamoto et al............. | 235/61.7 B |
| 3,688,086 | 8/1972 | Levasseur........................ | 235/61.7 B |
| 3,697,729 | 10/1972 | Edwards et al................. | 235/61.7 B |

Primary Examiner—Daryl W. Cook
Attorney, Agent, or Firm—Lynn L. Augspurger; Edward G. Fiorito; Paul W. Fish

[57] ABSTRACT

An automatic cash dispenser in which the security feature of a system is enhanced by providing the bank or other institution controlling the operation of the machine with the ability to periodically modify the security features of the machine. This flexibility in the security system for the cash dispensing machine includes the provision of the cryptographic input of the cash dispensing system which may be changed by the bank either periodically or as described.

45 Claims, 5 Drawing Figures

AUTOMATIC CASH DISPENSER AND SYSTEM AND METHOD THEREFOR

This is a continuation of application Ser. No. 277,230, filed Aug. 2, 1972.

This invention relates to cash dispenser apparatus or particularly to an improved cash dispenser having variable cryptographic features.

As is known, most bank transactions are handled by a teller in an established bank during normal banking hours. This, of course, imposes on the customer the obligation to transact his business within the defined hours of the bank. Thus, the bank experiences peak traffic of business during such times as paydays during which it is necessary for the customers to wait in line before being serviced by a teller.

Lately, to increase the banking services available to their customers, banks have introduced credit card actuated automatic cash dispenser machines. These are, for example, installations which allow the automatic withdrawal of cash by a person to whom a bank credit card has been issued. In operation, a bank customer is issued a credit card which allows him to withdraw money from his account at any time by presenting the card at an automatic cash dispensing machine and entering the appropriate information.

In the operation of such automatic cash dispensers, the card typically has the account information of the person to whom the card is issued. When the card is presented for use, it is inserted into the cash dispenser apparatus and the account information and security information is read from the card and compared, for example, with security information of the password type which is entered by the card holder via a keyboard or other information entry apparatus. Assuming a match between the account and security information, which may be stored on the card optically or magnetically, which is read when the card is inserted or presented for use in the machine and the security information which is entered via the information entry device by the card holder when the card is presented for use, a certain amount of cash may be withdrawn. This withdrawal is then charged against the card holders account and in all practical purposes, it is simply a withdrawal of funds on hand in an individual's bank account.

While these automatic cash dispensers have been very helpful in extending to the bank customers the opportunity to withdraw funds beyond the normal operating hours of the bank, there are several severe problems from the bank's standpoint. For example, many of the cash dispensers are located in remote locations and substantially unattended during the normal period of operation during any day. This presents an opportunity for unauthorized use of the machines in attempts to defraud the bank of funds by way of unauthorized withdrawals. One of the principal problems with the cash dispenser apparatus presently in use is that the system is subject to unauthorized use in the event a credit type card is lost or stolen. This is because the information on the card and the password are identical in their form in the event the unauthorized party holding the card is able to decipher the information on the card he can then present it for use and for fraudulently obtaining money from the institution operating the cash dispenser. In a similar manner, in the event a card can be forged or altered, it may similarly be presented for use and in the event the machine is unable to detect the difference in the password and the information then recorded on the credit card, an unauthorized use will likely occur.

Accordingly, it is an object of the present invention to improve the security of remote, unattended cash dispenser apparatus.

It is a further object of the present invention to minimize the possibility for unauthorized use of credit cards in a cash dispenser apparatus. It is a further object of the present invention to provide a means for periodically altering the cryptographic security features of a cash dispenser program.

It is yet another object of the present invention to provide improved means for permitting the use of a common credit card in a plurality of separate, independently operated dispensing apparatus.

The above object and other desirable aspects are achieved in accordance with the present invention by modifying in a cryptographic manner the information such as account and security information read from a card at the time it is presented for use prior to the comparison of information with information read directly into the cash dispensing apparatus via the data entry or input device, such as a keyboard. In this manner, the data previously stored on the card is modified in accordance with a predetermined algorithm prior to its comparison with the information entered into the cash dispenser by the person presenting the card for use. In this manner the password type personal identification information entered into the machine at the time the card is presented for use is not identical to the information read from the card which was previously stored on the card, however, it is some variable function thereof. This structure, method and apparatus increases the security of the system, in a manner hereinafter to be more fully explained, by preventing directly reading the information stored on the card or token to obtain the necessary password information.

As previously stated, the credit card, token or other indicia of being a depositor or account holder at the bank is issued at the time the person establishes the bank account. The card or other token issued to him as evidence of his account with the bank has stored thereon, preferably in magnetic form, an account number, account data and other security information. Upon presenting the token or card for use, the previously stored information on the card is read and entered into the cash dispenser. The amount to be withdrawn is entered into the machine via, for example, a keyboard and the password or other security information, for example, a four, five or six digit number is at the same time entered into the machine via a keyboard. Preferably, the credit card is drawn into the machine at which time the previously stored information on the security and account basis is read. In accordance with the present invention, the security information previously stored on the card is read and entered into the machine at the same time and in this manner, this information is then logically manipulated in accordance with a security or cryptographic algorithm to generate a personal number, for example, of some predetermined digit length.

This personal identification number which is now a cryptographic or logical function of the information previously stored on the card and read when the card is entered into the case dispenser apparatus is now ready for comparison with the personal account security information to be entered by the person presenting the card. The personal number may be a multidigit number of any length, for example 5 or 6 or 7 digits. These digits or passwords are entered, for example, via a keyboard and the security data or personal number entered via the keyboard are compared with the personal number generated in the machine in response to the information read on the card. In the event a comparison is favorable, i.e., true, then the normal cash dispensing cycle inititates. In the event comparison is false, the false comparison preferably lights a light to indicate to the user that he has improperly entered the number. Then the operator is entitled to attempt to properly enter his number a predetermined number of times, for example, twice. In the event he fails to properly enter the number within the permitted number of tries, the card is preferably held within the machine and the machine power cycle is shut down thereby preventing any further use by the person who wrongfully presented the card.

For a more complete understanding of the present invention, as to its preferred structure and method of operation, reference may be had to the following detailed description in conjunction with the drawings wherein.

Figure 1:
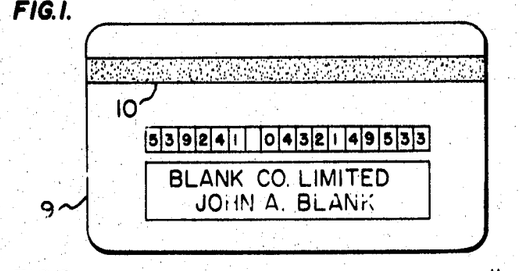
FIG. 1 illustrates a credit-type card utilizeable in accordance with the principles of the present invention.

Referring now to FIG. 1, there is shown a credit card 9 of the type utilizeable in accordance with the cash dispenser apparatus of the present invention. Each bank depositor who is to be entitled to use the automatic cash dispenser is issued a card as shown in FIG. 1. This card contains prerecorded information or data which are normally needed for banking type transactions. This data is inscribed or recorded in different areas of the card. For example, the name of the issuing bank, the date of expiration may be recorded for example on the magnetic track 10. Additionally, data concerning the client's account number and security information, for example a password, may be encoded in digital form on the magnetic track 10. Other data, for example to be used in limiting the number of times a card can be used in any period may be likewise recorded in predetermined areas of the magnetic stripes or in other manners either visible or invisible on the surface of the card. The information or data may be disposed or placed in various fields on the card in a manner in which it cannot be easily obliterated.

One important aspect of this type card is that it contains security information. When the bank client is issued a card, he is advised of his secret security or personal number. This number is to be entered into the machine when the client presents his credit card to a cash dispensing apparatus. As will hereinafter be more fully explained, when the card is presented if there is a predetermined relationship between the secret number entered into the machine when the card is transferred into the machine and the personal number or secret number which the person enters into the machine the user of the card is acknowledged as the rightful owner. In this manner, the use of the card is authorized and the unauthorized use is prevented.

Figure 2:
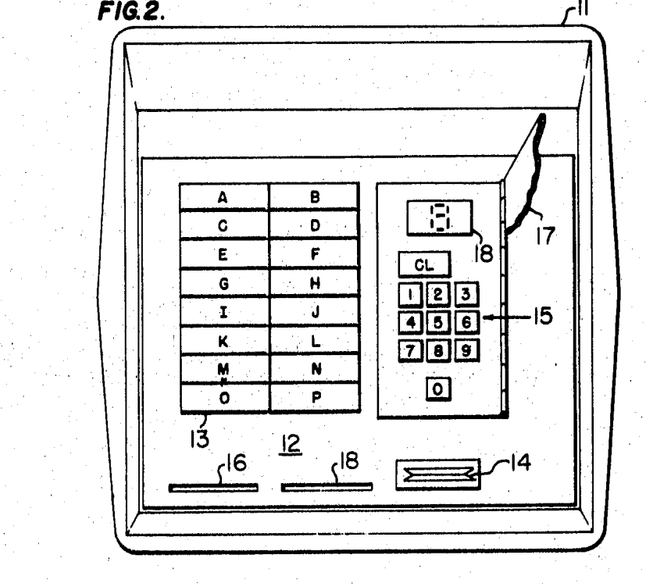
FIG. 2 is a partial view of the automatic cash dispenser system in accordance with the present invention.

Referring now to FIG. 2, there is shown a front view of an automatic cash dispenser 11. The cash dispenser itself wound be mounted in, for example the wall of the bank or another building with the face plate available to the public. Built into the wall or supporting structure would be the appropriate safe and other features which would protect the cash dispenser from improper operation. The front plate 12 is provided with a display window 13, a card receiving slot 14, an information entry device 15 and a dispensing slot 16. All of these aforementioned devices are of a structure in function known in the art.

The display window 13 is divided into sixteen sections, each connected to display a programmed sequence of instructions to the user of the dispenser. The display window will illuminate each of the instructions set forth in the following table in accordance with its instruction:

FIG. 2

| Identification | | User Instruction |
|---|---|---|
| A | | Open Door |
| B | | Empty |
| C | | Take Card |
| D | | Enter Personal Number |
| E | | Wait |
| F | | Again |
| G | | Select Account Number |
| H | | Card Retained |
| I | | 1-Current Account |
| J | Options | 2-Credit Card Account |
| K | | 3-Savings Account |
| L | | 4-Special Account (Add Code) |
| M | | Invalid Entry |
| N | | Select Amount |
| 0 | | Return Money Clip |
| P | | Card Retained |

To initiate the dispensing sequence, the customer inserts his card 9 into slot 14. If the machine is inoperative, EMPTY and TAKE CARD will be displayed. If the card is unacceptable, the door 17 will not open and the card is prevented from entering the system. Unacceptable cards may be retained in a drop box within the machine, however.

When an acceptable card is entered and drawn within the dispenser the door 17, which is optional, in unlatched and the dispensing sequence can be started by responding to the OPEN DOOR instruction.

After the door is opened, the ENTER PERSONAL NUMBER will be displayed, and the customer will index his personal password, which may be a number, into the keyboard information entry device 15, as he would a number on a "touch-tone" telephone. If during entry the customer recognizes an error is made, the password may be cancelled by striking the CLEAR (CL) key. He may thereafter re-index his password.

When the last character or digit of the password is entered, the ENTER PERSONAL NUMBER will be extinguished and WAIT will appear. After the number is checked, either ENTER PERSONAL NUMBER AGAIN will appear (if the number was not correct), the card will be retained (if the card is not valid) or, when the correct personal number has been entered, either the customer will be directed to an appropriate dispenser sequence or the SELECT ACCOUNT NUM- BER will appear. The valid card will also cause illumination of the remaining number of user display 18 (8 is shown).

An optional number of "false starts" may be allowed the customer in the foregoing sequence.

The SELECT ACCOUNT NUMBER may, at the user's option, and depending upon an acceptable code registered for the said, display the types of accounts to be debited, H through K of the display table above. AGAIN and INVALID ENTRY may appear in the event of a "false" entry by the customer, for an allowable number of times, or after a given period of time, after which the machine will proceed or enter an error routine.

If customer determined amounts are permitted at the time for the machine being used, the SELECT AMOUNT will be illuminated, and the customer will enter the amount desired. If an error is made by the customer, or an incorrect amount is inserted through the keyboard 15, AGAIN and INVALID ENTRY may be illuminated to allow for reselection. Failure to enter the correct amount will initiate the error routine.

After the valid amount has been entered, the desired currency (or other item to be dispensed) will be delivered to the customer through slot 16. At this time, RETURN MONEY CLIP will be illuminated. At this time the customer is expected to return the money clip into the slot 18, the returning clip slot.

The system then updates and re-records data on the card, and if the card is to be used again, it will be returned to the customer. If not, it will be retained. If the card is not withdrawn within a period of time from the time it is presented for customer retrieval, an alarm may sound.

A warning indicator may also appear inside the bank or other points if there is an error condition which should be brought to someone's attention. In the event of an error which requires card retention, then CARD RETAINED will be illuminated.

Figure 3:
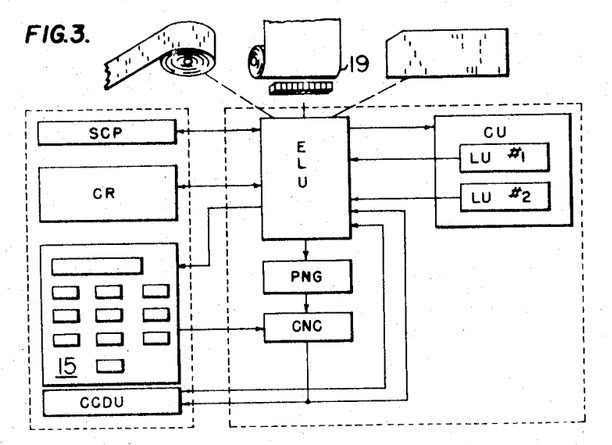
FIG. 3 is a simplified functional block diagram of a cash dispenser in accordance with one aspect of the principles of the present invention.

In accordance with the foregoing operation, we have provided an automatic cash dispenser in which two separate units, indicated by the broken lines in FIG. 3 may be provided, or which may be combined in the single unit. One part of the unit contains a security card reader, SCP. The SCP includes a read and write head. In addition, we have provided an account card reader CR having a read/write head. Both the CR and the SCP units communicate with an electronic logic unit, ELU. The ELU acts as a control unit for the cash dispenser and it may be programmed by cards or punched magnetic tape, and may be on line to a central computer system for real-time control. A printer 19 is connected to the ELU to which print the transactions.

Connected to the electronic logic unit is a personal number generator PNG which generates a personal number. The personal number generated corresponds to the password entered into a comparison circuit by the customer from the keyboard 15. If the comparison is true, a signal is delivered to cash dispense unit CDU, and cash or other items are released to the customer in accordance with the amount requested on the keyboard 15. The amount dispensed is registered in the electronic logic unit and released when the cash is dispensed for printing by the printer 19.

Accordingly, the account number which is read from the card can be printed on the printer 19 as well as any transaction that has taken place.

In order to maintain a security system the automatic cash dispenser is provided with several checks which prevent fraudulent use. The card has a secure card property read by the SCP. Reference may be had to the co-pending patent application Ser. No. 278,070, filed Aug. 4, 1972, also filed first in the United Kingdom on Oct. 13, 1971 and entitled: SECURITY ACCESS MEDIUM. Thus, a security verification may be made of a card as it is entered. The security identification contains a security "number," which may be verified within the system.

Additionally, the bank or owner of the system has control of the account numbers assigned to the card, and the system may count the number of times the card is used by a checking use delimiter number UD. The use delimiter number UD is changed each time the card is used.

In addition, one or both of the security Look-Up Tables LU No. 1, LU No. 2 in the cryptographic unit CU may be modified by the bank by entry, for instance by a punched paper tape, program modification as by the bank security input BSI. In addition, the records are secure because there is a separate functional relationship which may remain secret and separate from access to the other units as part of the personal number generator PNG. This function relationship is altered by changing the control circuit cards of PNG.

Figure 4:
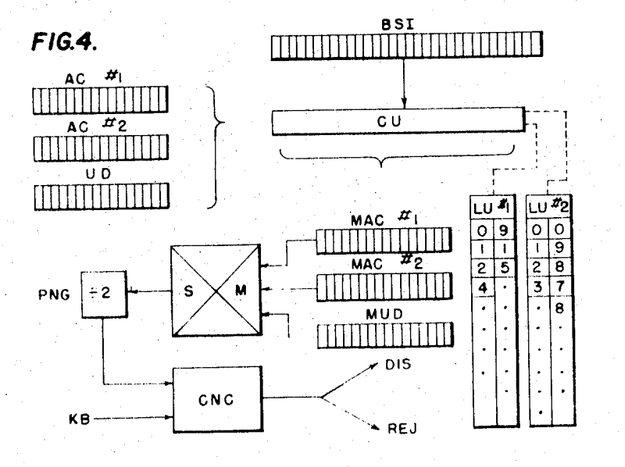
FIG. 4 is a table illustrating the cryptographic algorithm in accordance with one aspect of the principles of the present invention.

It will be seen that all of the checks and balances within the system may be thus secure from fraudulent use. The method of using the system may be illustrated by the algorithm represented in FIG. 4. One embodiment of the algorithm illustrated in FIG. 4 provides the account numbers AC No. 1 and AC No. 2, and a use delimiter number UD on the magnetic track 10. These are read by the card readers entered into electronic control unit. These numbers are randomized in the system by the addition of a random number to the "soft account number" AC No. 1, AC No. 2 as contained within the card. Thus modified, the account numbers, now MAC No. 1, MAC No. 2, may be used to look-up an encoded password which is related to the customer's password in accordance with the functional relationship determined by the circuit control card of PNG. This relationship between the encoded password and the decoded password which is known to the customer, which is secret, provides file protection even in the event of access to a password "dump." After the password has been decoded by the PNG, it can be compared with the decoded password known by the customer, and entered by keyboard entry into the comparison circuit CNC. The dispense reject routine may proceed according to the true or false output of the comparison circuit CNC.

To illustrate further by example, in order to operate this secure system, the credit card is inserted in the machine and read. The SCP security feature of the card contains a special number. This number is fed by the logic unit into the cryptographic unit wherein the LU No. 1, which is controlled by the bank security input, BSI, strips the special number of its random feature by subtraction or addition of a predetermined random appropriate number. This random number is under bank control and may be changed at any time by the BSI. Thus, for instance in the event that the first digit is a 1, that number is looked for in the first column of the look-up table. A 1 in the first digit generates a 1 in a new number, which is the random number stripped of its random identification. This sequence is followed for each number of the SCP number. This stripped number thus generated is placed in a register and then compared with the look-up table to determine whether the card is a valid part of the system. If the new number so generated is not a valid part of the system, the SCP check will reject the card and an error routine will proceed.

If it is part of the system, the program routine for dispensing cash will proceed, while a new number encoded by the random one-time procedure aforementioned, is placed in the SCP portion of the card. This new number may be the inverse of the new stripped number generated in the SCP check thus returning to the original SCP number. Or it may be an altered number as altered by a use subtraction. In that case, at the correct place in the look-up table the altered use number MUD is entered before it is passed backward through LU No. 1 and thereafter written on the card. This modification also changes the related look-up table for cards, so that an error routine will not be generated upon subsequent use. The modification of the file numbers random one-time look-up encrypting technique guarantees that any number read directly from the card is secure from cryptoanalysis.

As the cash dispensing program continues, the account numbers, which are read from the card by the CR reader, are transposed by the random number one-time system aforementioned, except utilizing the look-up table No. 2 (LU No. 2) which has in it a different random number addition sequence. These account numbers therefore appear as a modified account number, such as MAC No. 1 and MAC No. 2. These modificed account numbers which are the password file numbers therefore bear no relationship with the account number which may be read from the card. The modification an encryption is determined by the bank by the BSI. This modification may be made at any time and the entire file of password numbers may be changed to accommodate the new random digits of LU No. 1 and LU No. 2.

The password number, which is on file in the security module SM, bears the predetermined functional relationship to the password known to the customer, but it is not the same number. For instance, as illustrated in FIG. 4, the SM file contains passwords which are a multiple of 2 of the true password number. However, because this functional relationship is not known except to the bank, which may control it by inserting new functional circuit control cards into the ELU and PNG at any time. A dump of the SM will not yield the password. When the customer enters which account he desires be debited in a transaction, that number represented by MAC is passed from the SM to the personal number generator PNG where the aforementioned file password is divided by 2 and delivered to the comparison unit CNC. If the customer enters the correct password number KB from the keyboard 15, the identity of it with the personal number generated by the PNG causes the automatic cash dispenser program to proceed with its dispense routine. However, if it is not the same, an error routine will be generated as aforementioned. If the correct password is not inserted within the predetermined period of attempts, the card and dispensing routine will be rejected and the card will be dumped into a retention box (not shown) and CARD RETAINED will appear at the display.

In a preferred embodiment, the SCP reader measures a value, for example a digital value, which is encrypted and encoded on the magnetic stripe 10 of the card. The encrypted and encoded value is compared with the value which is generated by magnetic reading of a value of a hidden stripe of the card (not shown here, but shown in the aforementioned co-pending application "SECURITY ACCESS MEDIUM"). This stripe is in a specific position so that the read head of the system intercepts only cards having printing in the proper place. A measurement of the encrypted and encoded digital value of the magnetic stripe is achieved. This is compared with the look-up table for the specific card or directly with the value read from the hidden stripe. When a look-up table is provided, the look-up table value is compared with the value which is encrypted and encoded on the magnetic stripe and if the values agree, within very narrowly defined limits, the transaction is permitted to proceed. Preferably, this system of determining values determines the accuracy of bar spacing of magnetic ink bars in the hidden magnetic track of a plastic card. This card is printed with two passes of magnetic materials having two different inks, each ink having a different coercivity. Because the printing passes, due to printing tolerance problems result in a registration in the order of no better than 0.002 inches, the system measurement is designed to achieve an accuracy of approximately 0.0005 inches. Thus, the amount of registration can be determined and its value assigned for each card printed. This value may be stored in the look-up table or directly on the magnetic track 10.

The magnetic track 10 has encoded on it data which will be fixed for the life of the card. These would include the account numbers, the expiration date and the bank code, as examples. By application of a complex mathematical formula, these numbers are converted by an algorithm and a set of look-up tables to data which is retained in the system; namely, a specific encrypted and encoded number. The number may be specific for the card, or it may be specific to a specified account of a card which may have more than one authorized accounts. This number is then used for calculation of the personal number aforementioned, and the personal number is generated. The personal number is not encoded in any form on the card, but is generated by calculation using the other encoded data. When the personal number is fed to the comparison circuit CNC, the user is requested to enter via the keyboard his personal number. A check is made against the encrypted and encoded data which resulted in the generation of the user's personal number within the system and the transaction is permitted to proceed if there is identity.

The algorithm and its related mathematical formula acts to generate the look-up tables LU No. 1 and LU No. 2, which are stored in the cryptographic unit are under control of the bank. Look-up tables are generated by the bank and are known only to the bank. They are loaded into an area of the memory which is key-locked against unauthorized access. Each keylock is unique and the key can be issued to and retained by a designated individual, as for instance the bank manager. The bank may generate new look-up tables and implement a change in the look-up tables at any time. These look-up tables are, for example the series of random digits aforementioned. Although a few random numbers are shown as the look-up table "keywords,"

this number may be expanded to a large number to enhance the security of the system against cryptoanalysis. The method of calculation of the look-up tables may also be a secure property of the bank, or may be supplied to the service personnel in the form of cards which may be safe under lock and key.

Each ELU prints a derogatory file as the transactions proceed in the day. These derogatory files may be inspected by bank personnel, or polled via a data set by a central computer to determine if the derogatory file indicates a malfunction or a number of unauthorized accesses due to a security breakdown which might occur due to the dishonesty of personnel entrusted with the security of the system. When a fraudulent use is detected, the bank can completely change the "keyword" algorithm and look-up tables to again restore the secrecy of all passwords.

This system is enhanced by the possibility of "on-line" polling from a central computer so that the detection of attempts to duplicate card is considerably enhanced, and so that the system is not under the control of one individual.

Accordingly, we have described an automatic cash dispenser having a card security protection unit, a cryptographic unit for modifying a number which is read from the card, a personal number generator for determining a password based upon a number derived from the cryptographic unit, a comparison gate, a password keyboard entry connected to the comparison gate, and a dispense unit conditioned upon a true or false output of the comparison gate and dependent upon the correct entry of a password entered by a customer in the automatic cash dispenser and a password determined by the automatic cash dispenser to be the correct password for a valid account represented by a credit card request.

Figure 5:
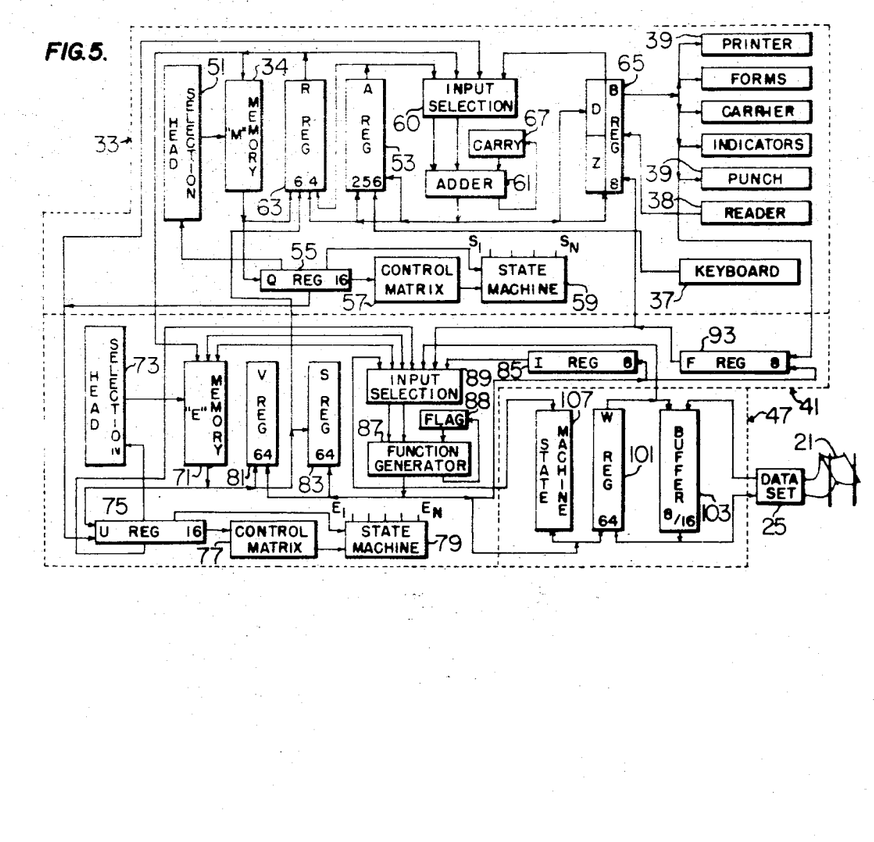
FIG. 5 is a view of the logic unit.

Preferably, the logic unit and cryptographic unit are part of a micro-programmable terminal computer, as illustrated in FIG. 5. The information taken from the card is read from the card by the card readers CR and SCP. The remote terminal computer may be connected to these readers by a data set or other input devices of the lines 21. The particulars of the function of the ELU can be performed by the remote processor 33, which is hereinafter described with respect to FIG. 5.

Referring now to FIG. 5 there is shown a logic block diagram of a terminal computer which may be used in practicing the principles of the present invention. For a more complete understanding of the structure and operation of the remote processor, reference may be had to U.S. Pat. No. 3,564,509, issued Apr. 22, 1968 to C. C. Perkins et al. or British Pat. No. 1,250,181 entitled Data Processing Machine. Both of the above referenced patents, which are owned by the assignee of the present invention, teach an embodiment of a micro-programmed, serial step stored program digital computer and are incorporated herein by reference.

Briefly, the terminal computer comprises a remote processor 33, a data communication processor 41 and a data communication buffer 47. The data communication processor 41 and the data communication buffer 47 provide the capability for exchanging on-line messages via a data set 25 and a communication link 21, for example, with a remote central computer. This communication capability enables the remote processor 33 to receive messages from the central computer and to send messages to the central computer, thus enabling the updating of current records and transactions at the remote processor.

In the preferred embodiment of the present invention, the lookup tables, LU1 and LU2, electronic unit functions, ELU, the personnel number generator function, PNG, and the comparison of the password personnel number function, CNC, would be performed by the logic of the remote processor 33. The main memory 34 for storing information may comprise a rotatable magnetic disk having a plurality of read-write heads for accessing general data and a stored program portion of the memory. The information and data stored in main memory 34 is processed in the arithmetic unit, which includes adder 61, carry circuit 67 and an input selection network 61, in accordance with program instructions withdrawn from the memory. The memory is addressed by head address selector 51 which may comprise an address register and associated selection matrix, thus providing access to designated portions of the memory in response to the address load in the address selection register.

In operation, a micro-instruction counter, for example, a word in recirculating register 53, is normally preset at the beginning of an operation to a predetermined count corresponding to the program step sequence to be performed and is arranged to sequentially withdraw the serial steps of the program stored in the memory in accordance with the count in the program counter, not shown. The micro-instructions withdrawn from the memory are sequentially loaded into micro-instruction register 55. The output of the micro-instruction register enables a control matrix 57 which, through an array of logic gates, generates appropriate control signals for controlling various logic functions including control of adder 61 and the interloop transfer between registers 53, 63, and 65.

The program and other data may be loaded into main memory 34 from the keyboard 37 or the memory loading means, for example, peripheral devices such as a tape or card reader 38. Information read into the processor is normally read via an input-output register 65 and then transferred under micro-program control to the main memory. As is known to those skilled in the computer art, the timing and sequence of the various operations of computer type logic circuitry must be accurately maintained. Timing is preferably controlled by a state machine 59 which generates appropriate logic levels or signals for enabling gates at times determined by a basic clock which may comprise, for example, a timing track on the main memory. In conjunction with other logical signals entered or operated by various input control devices, the clock-determined signals cyclically generate appropriate logic element controlling signals.

As herein before explained, a principal security feature of the present invention is the ability of the bank to periodically modify the security algorithm used to manipulate and modify the security data read from a credit card presented to the cash dispenser machine. In practicing the present invention, the security algorithm would be read into processor 33 to store lookup tables LU1 and LU2 in a predetermined portion of memory. Similarly, the password entered by the party presenting the credit card to the cash dispenser would be read into memory or register 53 via the keyboard 37. Under micro-program control in the manner herein above briefly described, and more fully explained in the herein above referenced patents, processor 33 would then under program control manipulate the data read from the secure card property of the credit card in accordance with the cryptographic algorithm stored in the lookup tables LU1 and LU2. This would be done, for example, by selectively addressing such tables in memory 34 to generate a new number which may be stored, for example, in a portion of register 63. In this manner, monoalphabetic or polyalphabetic substitutions may be made for each digit of the security data to generate a new personnel number from the security data read from the credit card.

The password entered via the keyboard 37 by the person presenting the credit card to the cash dispenser mechanism would then be compared logically, for example, by adding the contents of the registers 53 and 63 in the adder circuit 61 and comparing the sum with a constant stored in memory. Alternatively, a direct logical comparison of the password entered via keyboard 37 and the personnel number generated as a function of the contents of the lookup tables stored in main memory may be made. In either case, the comparison of the password and the number generated from security data from the card determines whether the party attempting to utilize the machine has entered the proper number as determined by the cryptographic algorithm and the security data on the card and thus is one currently entitled to utilize the card as presented. This procedure gives the bank control of those utilizing the card, for example, to withdraw money from a cash dispenser mechanism as herein It will be understood that the SCP reader determines whether the card is acceptable or not after it is inserted into slot 14. From the foregoing description, it will be understood that the hidden magnetic material is magnetized after it is inserted into the machine. At this position, the card, which has been magnetized after being inserted in the machine may be compared with the previously generated personal identification representation which is a function of a keyword, in the manner described. The keyword, will be understood to be a factor, a number, quanity element symbol or alpha or numeric representation or combinations thereof. Preferably the keyword is a numeric factor which is determined from a polyalphabetic table. The personal identificatin representation or password, is to be understood to be comparatable with the keyword, and may also be a factor number, quantity or element or symbol, or alpha or numeric representation or combination thereof. If after writing to magnetize the secure portion of the card it is determined that the card is unacceptable the card will be rejected. The security number which is encoded on the card may remain on the card after it is rejected from the machine. However, the mere duplication of the number generated is a function of the secure property which is not detectable when removed from the writing system will not detract from the security of the system because of the generation of the value due to magnetic material in the card each time the card is read. This may be verified by the bank via the electronic logic unit as previously described. By periodically changing the cryptographic algorithm stored in the main memory, the unauthorized use of cards may be prevented, thus making the use of unattended machines more secure from attempted fraudulent use.

As will be understood by those skilled in the computer art, other logical circuitry may be employed to implement the logic functions herein above outlined in connection with the generation of the personnel number as a cryptographic function of the secure card property or security data stored on the credit card. Similarly, other logic means may be employed to store the cryptographic algorithm and to provide comparison between the number generated internally in the machine as a function of the contents of the lookup tables and the password entered by the party presenting the card for use. In practicing the present invention, it is preferable to use a micro-programmed machine in that it provides greater flexibility in periodically modifying the cryptographic algorithm thereby providing greater security for the cash dispenser system.

While the foregoing discloses a particular embodiment of the various operating elements of a micro-programmed computer suitable for practicing the present invention, it is to be understood that the embodiment is illustrative only and that the principles of the present invention may be practiced by those skilled in the computer art with many variations, changes, substitutions and other departures from the disclosed embodiment without departing from the scope of the applicant's invention which is described in the appended claims.

What is claimed is:

1. An automatic dispenser, comprising a dispensing device, a credit card information entry device, and control means for the dispensing device responsive to the credit card information entry device and to information taken from a credit card for the automatic dispenser, means for modifying the information taken from the card for generating a first unique number to validate the credit card, personal identification generator means for generating a second unique number, comparison means for comparing said second unique number with password data entered by a dispenser user in said credit card information entry device in order to validate the dispenser user and for providing a proceed signal to said control means if said user is validated.

2. An automatic dispenser as claimed in claim 1 wherein the second unique number is a generated personal identification representation and is different from data entered by the said user, said comparison means determining whether said personal identification representation bears a predetermined functional relationship to the password data known to a valid user.

3. An automatic dispenser according to claim 2 in which the keyword is a one time random number.

4. An automatic dispenser as claimed in claim 2 wherein said functional relationship is variable, said comparison means including a programmable unit which contains a changeable value controlling a mathematical manipulation of said second unique number during its comparison with said password data.

5. An automatic dispenser according to claim 1 wherein said means for modifying information taken from the card for generating a first unique number includes a cryptographic unit utilizing a keyword for decoding security data on the card which is determined as indicating the validity of the card.

6. An automatic dispenser as claimed in claim 1 wherein the value of said second unique number is solely generated after said card has been read.

7. An automatic dispenser according to claim 1 wherein the first unique number is derived from data stored on the card.

8. An automatic dispenser according to claim 1 wherein said first unique number is derived from data stored on the card and polyalphabetic tables of data.

9. A dispenser according to claim 1 further including means for verifying the presence of a secure card property determined from the credit card and peculiar to a particular individual credit card of the system having a known relationship with a particular account.

10. An automatic dispenser according to claim 1 including means for determining that said card has a security area which includes a plurality of magnetic areas and that one or more of said magnetic areas has a detectable coercivity different from that of other magnetic areas.

11. An automatic dispenser according to claim 1 wherein said means for generating a first unique number includes means for measuring a registration difference of a plurality of spaced magnetic areas which, as a consequence of printing said areas on the card used in two passes results in a registration difference between cards, which difference is adapted to differentiate a particular card from other like cards manufactured for use in the dispenser.

12. An automatic dispenser according to claim 1 wherein said personal identification generator means may be modified from time to time by a program change to modify a predetermined functional relationship to password data known to a valid user.

13. A credit card transaction system including an account number information entry means, means for verifying the validity of the account number information, present on a credit card, processor means, means for generating a value functionally related to at least a portion of card security information on said card, means for comparing said value with separate value means entered into said processor whereby a determination is made as to whether a transaction shall proceed or shall be rejected, additional means for validating a password entered by the user by comparison with a personal number available to said processor means and not recorded on said credit card.

14. The system of claim 13 further including a signal indicating that the transaction shall proceed such that the account may be debited as a correct response to information including said card security information and said password via said information entry means.

15. The system of claim 13 further including means for verifying the presence of a secure card property determined from the credit card of the system having a known relationship with a particular account of the system, the encrypted value of said secure card property being stored on said card as card security information.

16. A credit card system according to claim 13 wherein said value is encrypted and stored on said card.

17. The system according to claim 13 including means for determining that said card has a plurality of magnetic areas and that one or more of said magnetic areas have a detectable coercivity different from that of other magnetic areas.

18. The system according to claim 13 wherein said means for generating a value includes means for measuring a registration difference of a plurality of spaced magnetic areas, which registration difference distinguishes a particular card from other like cards manufactured for use in said system.

19. A system according to claim 13 wherein the personal number available to said processor means has a functional relationship to said password determined by a changeable function which may be altered by changing processor data.

20. A security apparatus responsive to the insertion of a credit card or the like for determining whether a predetermined relationship exists between security data stored on said card and personal identification data entered by the individual presenting such card for use, said security apparatus comprising:
   data recovery means for receiving said card and for reading security data recorded thereon,
   cryptographic logic means responsive to said data recovery means for modifying in accordance with a predetermined cryptographic algorithm security data read from said credit card,
   first comparator logic means for determining whether said modified security data corresponds to card security data valid for said apparatus,
   data entry means actuatable by the individual presenting the card for use for entering said personal identification data into said security apparatus,
   second comparator logic means for determining whether a predetermined relationship exists between the output of said cryptographic logic means and data entered via said data entry means.

21. The security apparatus of claim 20 wherein said cryptographic logic means includes means for storing polyalphabetic crptographic tables of data and means for personal number which is a function of the security data recorded on said card modified in accordance with the cryptographic tables of data, said personal number being different than the said personal identification data known to an authorized individual user of the security apparatus.

22. Security apparatus as defined in claim 20 including means for writing on a card presented for use in determining a value therefrom, said value being related to security data recorded on said card.

23. A security apparatus as defined in claim 20 wherein said cryptographic logic means include a random data table which may be modified from time to time such that data recovered by data recovery means may be unacceptable even though data entered via said data entry means was acceptable at a different point of time when a different table was utilized.

24. An apparatus according to claim 20 wherein said data recovery means includes means for sensing a plurality of magnetic areas, at least some of which have a coercivity different from other areas.

25. An apparatus according to claim 20 wherein said data recovery means measure a registration difference of a plurality of magnetic areas which difference is a consequence of printing said areas to have registration difference between cards during manufacture and is adapted to differentiate a particular card from other like cards manufactured for use in the apparatus.

26. An automatic dispenser according to claim 20 wherein said second comparator logic means is adapted to have said predetermined relationship modified by entry of functional data into said apparatus to change said predetermined relationship from time to time.

27. An automatic cash dispenser comprising a cash dispensing device and a credit card information entry device, control means for the cash dispensing device responsive to a password entered by a user into said credit card information entry device and to information taken from a credit card entered into the automatic cash dispenser, means for modifying the information taken from the card for generating a personal identification representation which is a function of a keyword, which keyword has a variable value when credit cards are inserted into the automatic cash dispenser from time to time, comparison means for comparing said password and said personal identification representation, said keyword being a control variable for said comparison means.

28. An automatic cash dispenser claimed in claim 22 wherein said keyword is a random number keyword.

29. An automatic cash dispenser according to claim 23 wherein said keyword is a one-time random number keyword.

30. Automatic cash dispenser according to claim 27, wherein said personal identification representation is an encrypted password which is decoded in said comparison means.

31. An automatic dispenser according to claim 27 wherein is provided means for determining that said card has a security area which includes a plurality of magnetic areas, and that one or more of said magnetic areas has a detectable coercivity different from that of other magnetic areas.

32. An automatic dispenser according to claim 27 including means for reading a security value from said credit card, said value being determined after reading a plurality of magnetic areas which have a registration difference from other like cards manufactured for use in the dispenser and which registration difference is adapted to distinguish a particular card from other like cards.

33. A credit card transaction system comprising:
a micro-programmatic processor having a logic unit and a cryptographic unit,
a credit card entry device,
a credit card reader,
comparison gating means,
a password keyboard entry device,
a dispensing unit conditioned upon a true or false output of said comparison gating means and dependent upon the correct entry of a password entered into said password keyboard entry device and a personal number generated within said micro-programmable processor which is determined to be the correct personal number for a credit card entered into said credit card entry device, and
said comparison gating means including a first and second look-up table, said first look-up table under program control being utilized to determine whether the entered credit card is a valid part of the system, said second look-up table being utilized to determine a modified account number.

34. A credit card transaction system according to claim 33 wherein said micro-programmable processor includes a derogatory file unit for recording transactions of the system.

35. A credit card transaction system according to claim 33 wherein said micro-programmable process is a data communication terminal of a remote processor, said comparison gating means being part of said remote processor.

36. A verification system for verification of a record bearing document and information contained in said document such as a credit card comprising:
means for receiving a record bearing document within a device,
means for writing on said document after said document is received into said device after presentation by a user of said document, said writing being in an area of said document in which there has been deposited a plurality of magnetizable ink zones, some of said zones being of an ink of a different coercivity than the other zones,
means for reading information contained on said document after receipt of said document, which information was contained on said document before it is entered into said device, and for reading a value which is generated as a consequence of said writing after presentation by a user of said document,
means for comparing said information and said value for verifying the validity of said document.

37. A system according to claim 36 wherein said document is a credit card and wherein the value read after said writing is peculiar to an individual credit card of the system having a known relationship with a particular account of a credit card transaction system.

38. A security system utilizing documents which differ from one another such that a particular document can be determined as being valid for use in a particular transaction, comprising:
means for receiving said document presented for use,
means for applying an electromagnetic field to said document after receipt,
security means for determining a security value of said document which distinguishes it from other like cards, said security means measuring a registration difference of a plurality of spaced magnetic areas which, as a consequence of printing said areas on document for the system in two passes, results in a registration difference between cards which difference is adapted to differentiate a particular card from other like cards of the system,
means for comparing said security value with a stored representation of said security value and for authorizing the particular transaction to proceed.

39. A system according to claim 38 wherein is included means for determining that some of said magnetic areas have a detectable coercivity different from that of other magnetic areas.

40. A credit card transaction system comprising:
a processor having a logic unit and a cryptographic unit,
a credit card,
a credit card entry device,
a credit card reader,
comparison gating means,
a password keyboard entry device,
a dispensing unit conditioned upon a true or false output of said comparison gating means and dependent upon the correct entry of a password entered into said password keyboard entry device and a personal number generated within said processor which is determined to be the correct personal number for a credit card entered into said credit card entry device, and said comparison gating means including a card validating means utilized to determine whether the entered credit card is a valid part of the system, said card validating means being adapted to receive a value of a secure card property of said card, said value being derived from a reading of an area of a credit card being used in the system, said credit card having a plurality of magnetizable ink zones, some of said zones being of an ink of a different coercivity, said credit card reader having means to detect said different coercivity of said zones and to read a value of said zones and to provide said value to said card validating means, said card validating means being adapted to compare said value with a related separate value stored in said system, which separative value has a predetermined relationship to said value, such that comparison of said value and said related separate value determines card validity.

41. A credit card transaction system comprising:

a processor having a logic unit and a cryptographic unit, a credit card, a credit card entry device, a credit card reader, comparison gating means, a password keyboard entry device, a dispensing unit conditioned upon a true or false output of said comparison gating means and dependent upon the correct entry of a password entered into said password keyboard entry device and a personal number generated within said processor which is determined to be the correct personal number for a credit card entered into said credit card entry device, and said comparison gating means including a card validating means utilized to determine whether the entered credit card is a valid part of the system, said card validating means being adapted to receive a value of a secure card property of said card, said value being derived from a reading of an area of a credit card being used in the system, said credit card having a plurality of magnetizable ink zones, some of said zones being of an ink of a different coercivity, said credit card reader having means to detect said different coercivity of said zones and to detect the registration of said zones in said card being used, which registration differs from the registration of other like cards manufactured for use in said system, and to derive from reading said zones a value and to provide said value to said card validating means, said card validating means being adapted to compare said value with a related separate value stored in said system, which separative value has a predetermined relationship to said value, such that comparison of said value and said related separate value determines card validity.

42. A system according to claim 41 wherein said processor includes personal identification generator means for generating a second unique value, said comparison gating means comparing said secoind unique value with password data entered by a dispenser user in said credit card entry device in order to validate the dispenser user and for providing a proceed signal to said dispenser if said user is validated.

43. A system as claimed in claim 42 wherein the second unique value is a generated personal identification representation and is different from data entered by the said user, said comparison gating means determining whether said personal identification representation bears a predetermined functional relationship to the password data known to a valid user.

44. A system as claimed in claim 43 wherein said functional relationship is variable, said processor having a unit which contains a changeable value controlling a mathematical manipulation of said second unique value during its comparison with said password data.

45. A system as claimed in claim 44 wherein said comparison gating means includes look-up table means, said look-up table means being utilized for determining a modified account number which is adapted for use in connection with comparison with said password to validate the user of said credit card.

* * * * *